United States Patent
Smeeton et al.

(10) Patent No.: US 11,147,169 B2
(45) Date of Patent: Oct. 12, 2021

(54) IMPACT ABSORBING ELEMENT FOR DISPLAY DEVICE

(71) Applicant: Sharp Kabushiki Kaisha, Osaka (JP)

(72) Inventors: Tim Michael Smeeton, Oxford (GB); Mayuko Sakamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 119 days.

(21) Appl. No.: 16/672,794

(22) Filed: Nov. 4, 2019

(65) Prior Publication Data

US 2021/0136933 A1    May 6, 2021

(51) Int. Cl.
| | |
|---|---|
| *H05K 5/00* | (2006.01) |
| *G09F 9/30* | (2006.01) |
| *B32B 15/04* | (2006.01) |
| *G06F 1/16* | (2006.01) |
| *B32B 15/20* | (2006.01) |

(52) U.S. Cl.
CPC .......... *H05K 5/0017* (2013.01); *B32B 15/04* (2013.01); *B32B 15/20* (2013.01); *G06F 1/1641* (2013.01); *G09F 9/301* (2013.01); *G02F 2201/08* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 7,679,285 | B2* | 3/2010 | Kim | H05K 7/20963 313/582 |
| 9,370,112 | B2* | 6/2016 | Park | H05K 5/02 |
| 10,046,536 | B2* | 8/2018 | Jang | B32B 3/08 |
| 10,114,422 | B2* | 10/2018 | Lee | G06F 1/1656 |
| 10,198,038 | B2* | 2/2019 | Jang | G06F 1/1643 |
| 10,681,843 | B2* | 6/2020 | Paseman | G06F 1/206 |
| 2010/0002402 | A1* | 1/2010 | Rogers | H05K 1/028 361/749 |
| 2010/0245221 | A1* | 9/2010 | Khan | G02F 1/13476 345/87 |
| 2014/0376191 | A1* | 12/2014 | Hwang | F28F 13/18 361/720 |
| 2015/0086763 | A1* | 3/2015 | Nam | H01L 51/524 428/212 |
| 2017/0357325 | A1* | 12/2017 | Yang | G06F 3/0445 |

(Continued)

*Primary Examiner* — Anthony Q Edwards
*Assistant Examiner* — Rashen E Morrison
(74) *Attorney, Agent, or Firm* — Renner, Otto, Boisselle & Sklar, LLP

(57) ABSTRACT

A light-emitting device has improved impact resistance over conventional configurations. Such a light-emitting device includes a display panel layer, a housing layer, an impact absorbing layer adjacent the housing layer, a metal layer that is disposed between the impact absorbing layer and the display panel layer and that is deformable during an impact on the light-emitting device, and a compliant layer that is disposed between the metal layer and the display panel layer that enables a shape of the display panel layer to be maintained when the metal layer is deformed. Due to a compliance or low stiffness of the compliant layer, a permanent deformation of the metal layer due to an impact or device shape change is not discernibly transferred into the shape of the display panel layer, and the shape of the display panel layer is essentially maintained so that an impact or shape change does not adversely affect display performance.

20 Claims, 6 Drawing Sheets

(56) References Cited

U.S. PATENT DOCUMENTS

| | | | | |
|---|---|---|---|---|
| 2018/0204884 A1* | 7/2018 | Isa | .......................... | H05B 33/26 |
| 2018/0217639 A1* | 8/2018 | Jones | .................... | G06F 1/1652 |
| 2019/0132963 A1* | 5/2019 | Yu | ....................... | H01L 51/5246 |
| 2020/0119290 A1* | 4/2020 | Shin | ...................... | H01L 51/524 |
| 2020/0388783 A1* | 12/2020 | Kang | .................. | H01L 51/5246 |

* cited by examiner

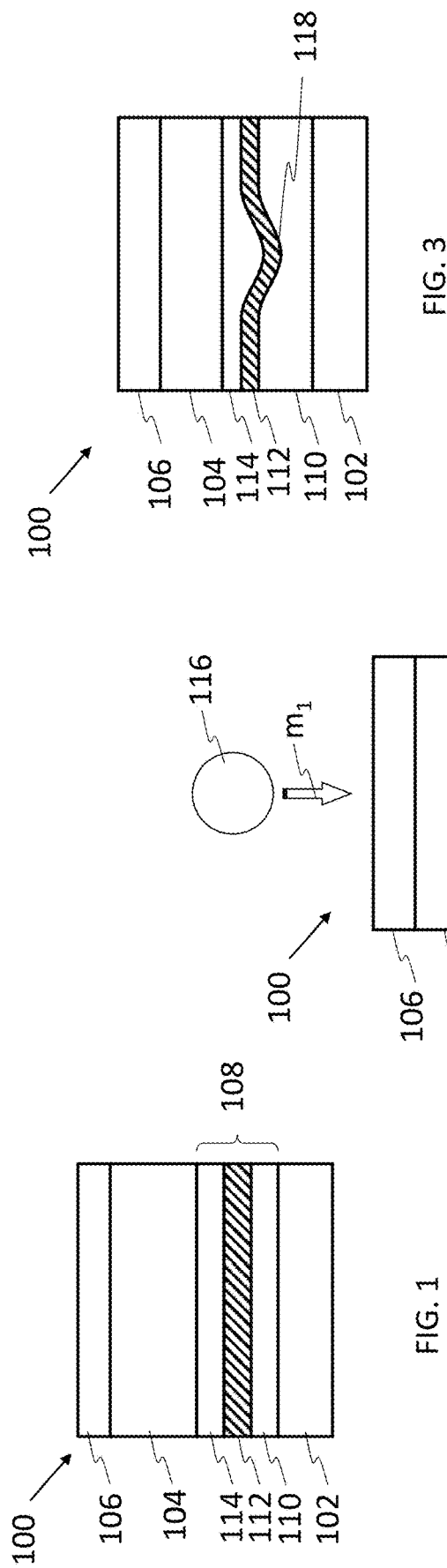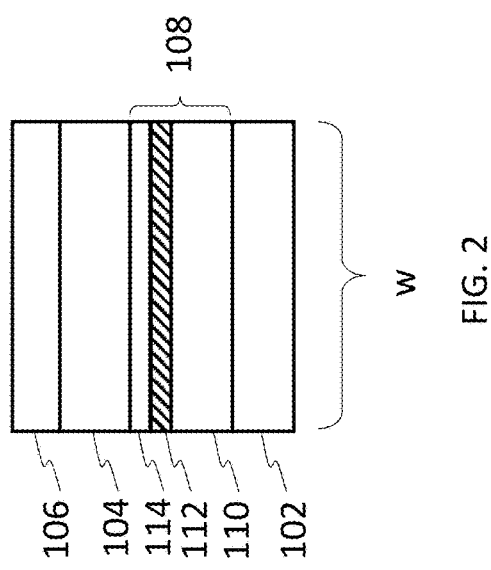

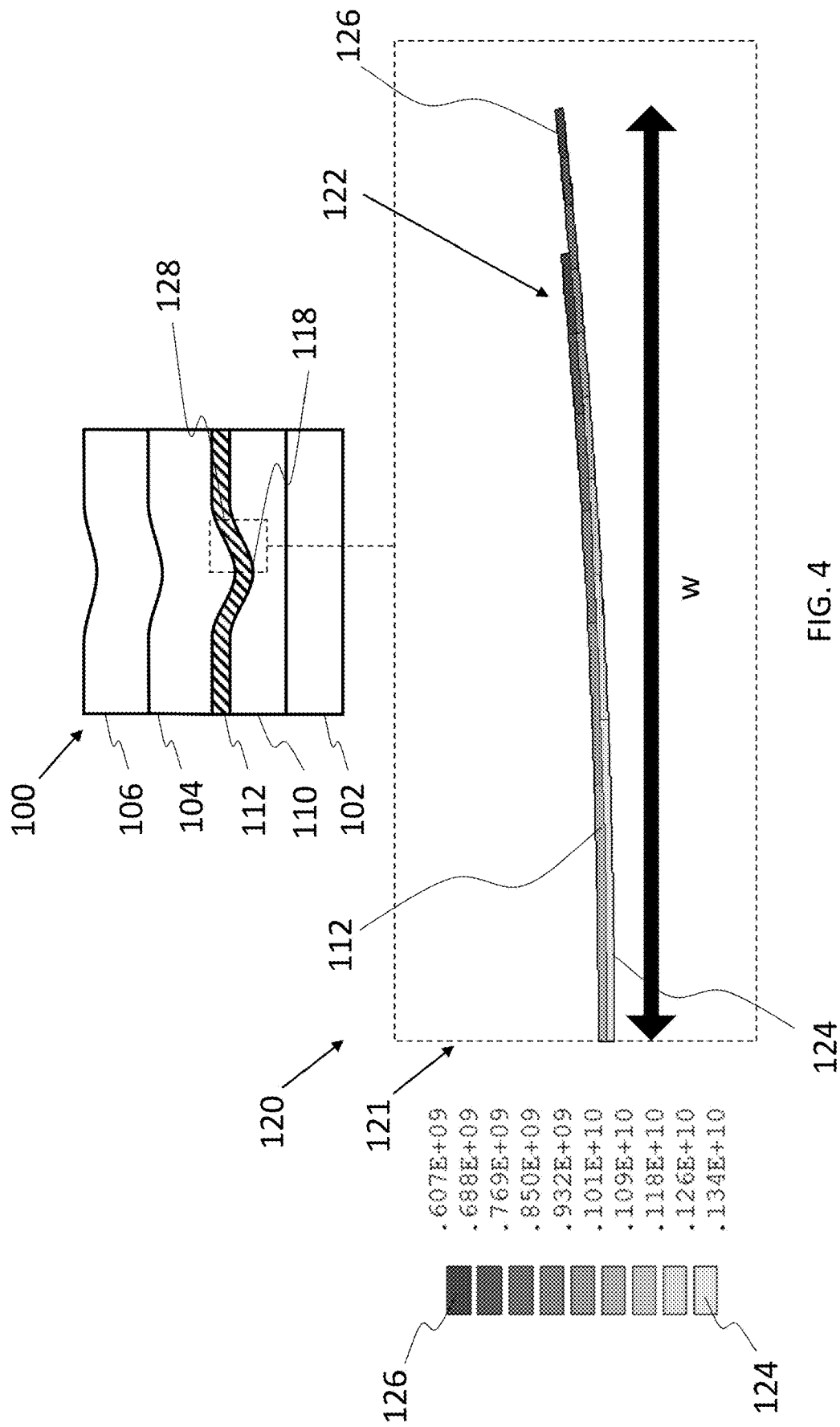

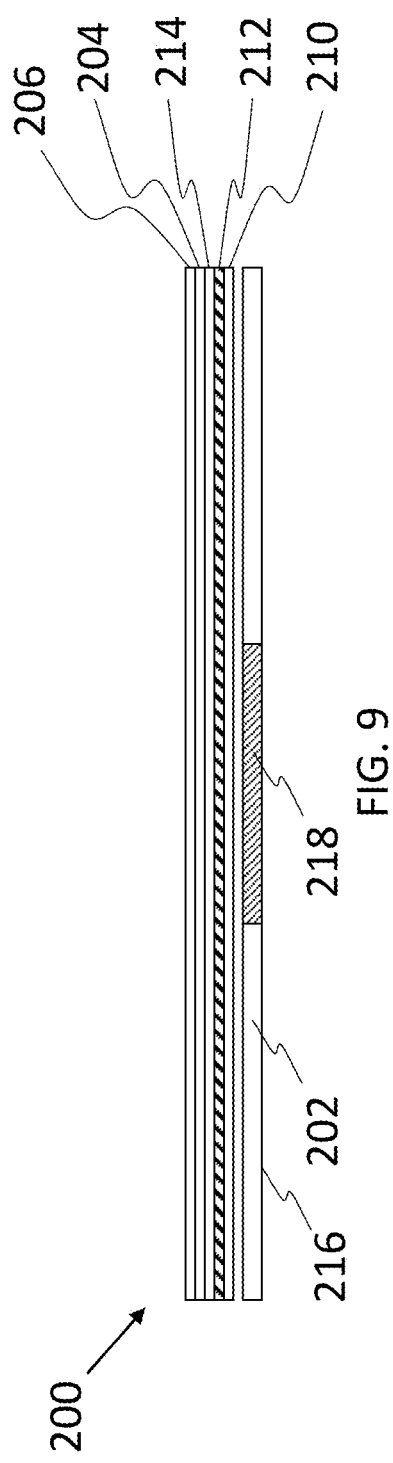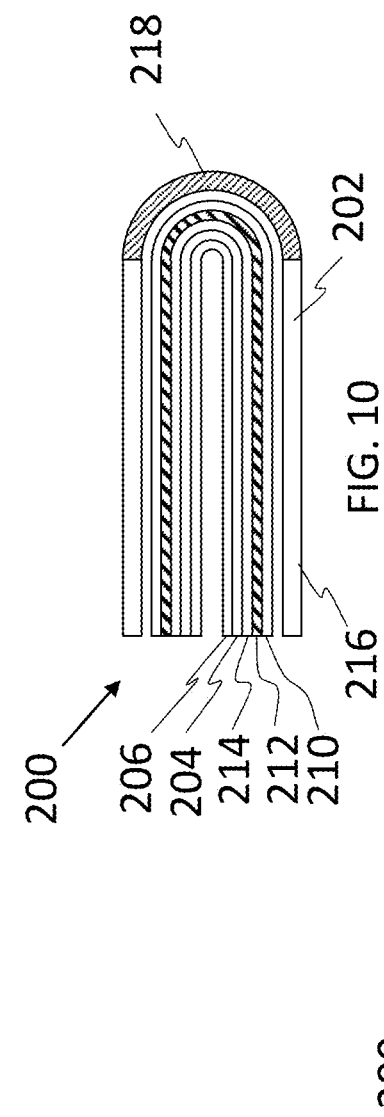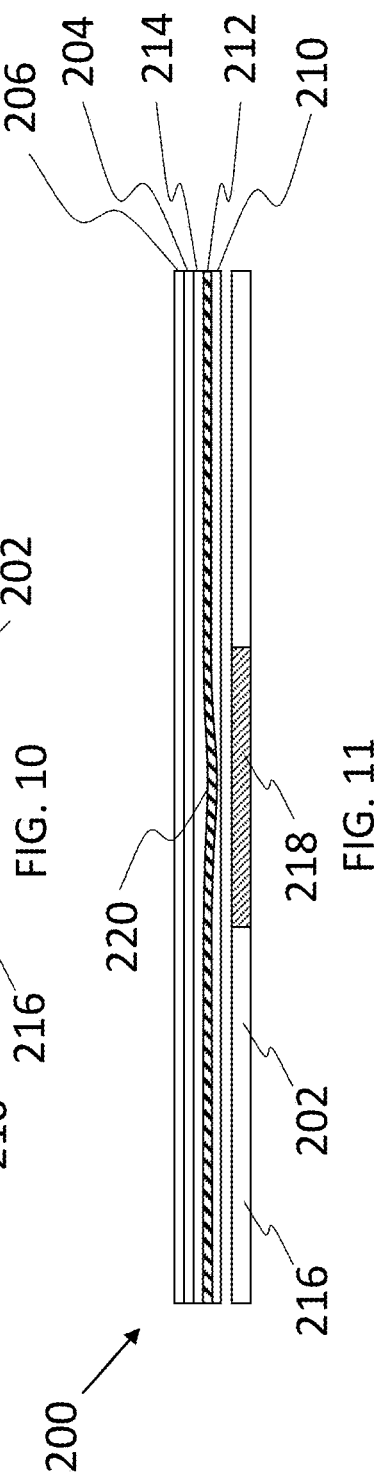

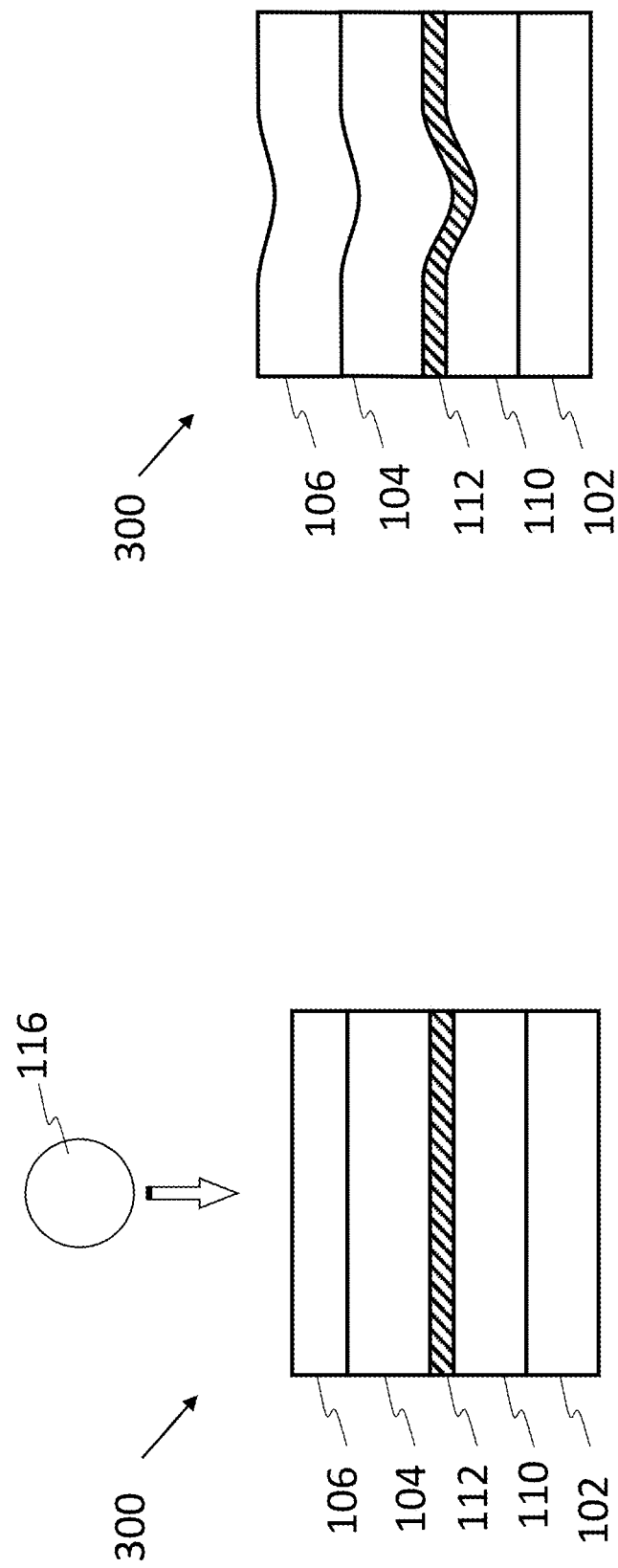

IMPACT ABSORBING ELEMENT FOR DISPLAY DEVICE

TECHNICAL FIELD

The present invention relates to a display device, and more particularly to a light emitting diode (LED) display device having a layered structure that is configured to prevent discernible damage caused by an impact of an object on the display device.

BACKGROUND ART

A conventional information display device is formed of a stack of layers that includes, for example, a matrix of organic light-emitting diodes (OLEDs) disposed on a substrate, a touch sensor, and an optical polarizer. The layers may be bonded together using adhesive layers. The display device may further be bonded to a window through which the light from the display is emitted. The window also provides a physical protection of the layers in the display. A housing is provided to support the display and provide protection of the layers of the display on the surface opposite to the window and around the edges of the display.

Information display devices may also be bendable, such that their shape is changed repeatedly during their use. For example, bendable displays may be bent or folded such that at least some part of the display has a curvature at certain times and is substantially flat at other times. Bendable displays may have a window that is deformable without failing, such as by cracking or yielding, and without requiring a high force to cause the deformation. Conventional display devices that enable the window to deform without failing use windows that are thin and/or are formed of a material with low stiffness. For example, polymer materials may be a suitable material for a window film. In other devices, glass windows having a thickness below 100 microns may be suitable. In non-bendable display devices in which the shape of the display is not changed repeatedly during use, a relatively thick glass window having a large thickness between 400 and 700 microns may be suitable.

Bendable or non-bendable display devices may be permanently damaged by an impact onto the outer surface of the window, or the surface of the window which is not bonded to another layer of the display. An object may be dropped onto the outer surface of the window and the impact may cause permanent damage to the display device. In non-bendable display devices, the large thickness and a high stiffness of the window material, such as a modulus of elasticity between 50 to 100 GPa, may enable the deformation caused by the impacting object to be distributed over a relatively large area of the display device. Consequently, the maximum stress and strain in the materials that form the display device may be low. In windows for bendable display devices, however, a low thickness that is less than 100 microns, and/or a low stiffness such as a modulus of elasticity that is around 3 GPa, may result in the deformation being highly localized in the near vicinity of the impacting object.

Prior attempts have been made to improve the impact absorption of display devices. One prior attempt includes providing a shock mitigating layer that includes an elastic member and a graphite layer, as set forth in U.S. Pat. No. 10,046,536 (Jang, issued Aug. 14, 2018). Another prior attempt includes providing a shock absorbing layer which includes an elastic material, such as rubber, that is disposed between a heat sink and a display panel, as set forth in U.S. Pat. No. 10,114,422 (Lee et al., issued Oct. 30, 2018). Still another prior attempt includes providing an impact absorption sheet that includes bubble outlets, as set forth in U.S. Pat. No. 9,370,112 (Park, issued Jun. 14, 2016).

SUMMARY OF INVENTION

There is a need in the art for improvements in impact resistance of display devices, including for bendable display devices that have relatively thin and low-stiffness windows. The present disclosure describes a light-emitting diode (LED) display device which includes a housing, a display panel layer located above the housing, and an impact absorbing element disposed between the housing and the display panel layer that includes an impact absorbing layer, a metal layer, and a compliant layer that is disposed between the metal layer and the display panel layer. When the display device is subjected to an impact by an impacting object, the compliant layer prevents the transfer of a deformation in the metal layer to the display panel layer, such that the display device will have no discernible damage that is viewable by a user of the display device. Due to a compliance or low stiffness of the compliant layer, a permanent deformation of the metal layer is not discernibly transferred into the shape of the display panel layer, and the shape of the display panel layer is essentially maintained.

The compliant layer may be particularly advantageous if the display device is bendable, such that the display device is configured for inward or outward bending or folding. When the display device is folded at least one time, a plurality of times, or held in a folded state for a prolonged period of time, a permanent crease may form in the metal layer. Providing the compliant layer between the metal layer and the display panel layer reduces the transfer of the creased shape to the display panel layer. Accordingly, even if the crease formed in the metal layer becomes permanent, the crease will not be discernible when viewing the display device. Additionally, using the compliant layer enables the bendable display device to undergo more shape change cycles before any crease would be discernible by a user of the display device, as compared with conventional bendable display devices that do not include a compliant layer between the metal layer and the display panel layer.

Accordingly, an aspect of the invention is a light-emitting device having improved impact resistance over conventional configurations. In exemplary embodiments, a light-emitting device includes a display panel layer, a housing layer, an impact absorbing layer adjacent the housing layer, a metal layer that is disposed between the impact absorbing layer and the display panel layer and that is deformable during an impact on the light-emitting device, and a compliant layer that is disposed between the metal layer and the display panel layer that enables a shape of the display panel layer to be maintained when the metal layer is deformed.

In exemplary embodiments, the compliant layer may have a stiffness that is less than a stiffness of the display panel layer. The compliant layer is formed of at least one of an elastomer material, a polymer material, or an adhesive material. The compliant layer may have a stiffness that is less than a stiffness of each of the metal layer and the impact absorbing layer. The stiffness of the compliant layer may be between 50 kPa and 1 GPa. The display panel may have a stiffness that is between 1 GPa and 10 GPa. The compliant layer may have an anisotropic stiffness, such that a planar stiffness in a plane of the compliant layer is greater than a thickness stiffness in a thickness direction of the compliant layer. The compliant layer may be formed as a multilayer of different materials and have a thickness that is between 10 and 100 microns.

In other exemplary embodiments, the metal layer may be formed of an alloy material that includes at least one of iron, aluminum, or copper, such as for example a stainless steel alloy. The metal layer may have a thickness that is between 10 and 100 microns.

In other exemplary embodiments, the light-emitting device may include a window film layer disposed adjacent the display panel layer opposite the compliant layer. The window film layer and the display panel layer may be bendable. The window film layer may be formed of at least one layer of a glass material, a polyimide material, or a thermoplastic material. The window film layer may have a thickness that is between 10 and 150 microns. The window film layer may include a hard coating disposed on a polymer material.

In other exemplary embodiments, the impact absorbing layer may be formed of at least one layer of a polymer material and have a thickness that is less than 1 millimeter.

Still another aspect of the invention is an electronic display device having at least one light-emitting device according to any of the embodiments. In such an electronic device, the display may include at least one of a touch sensor layer, a polarizer layer, and an adhesive layer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 is a drawing depicting an exemplary light-emitting device having an impact absorbing element for a display panel in accordance with embodiments of the present invention.

FIG. 2 is a drawing depicting the light-emitting device of FIG. 1 prior to a collision of the light-emitting device with an impacting object.

FIG. 3 is a drawing depicting the light-emitting device of FIG. 2 after the impacting object has collided with the light-emitting device and has been removed from the light-emitting device.

FIG. 4 is a drawing depicting a finite element analysis of a deformable metal layer of the light-emitting device of FIG. 3 during the collision.

FIG. 9 is a drawing depicting an exemplary bendable light-emitting device having an impact absorbing element for a display panel in accordance with embodiments of the present invention.

FIG. 10 is a drawing depicting the bendable light-emitting device of FIG. 9 when in a folded state.

FIG. 11 is a drawing depicting the bendable light-emitting device of FIG. 9 after the bendable light-emitting device has been folded at least one time.

FIG. 12 is a drawing depicting an exemplary light-emitting device having an impact absorbing element for a display panel and showing the impact absorbing element without a compliant layer.

FIG. 13 is a drawing depicting the light-emitting device of FIG. 12 after an impacting object has collided with the light-emitting device and has been removed from the light-emitting device.

DESCRIPTION OF EMBODIMENTS

Figure 5:
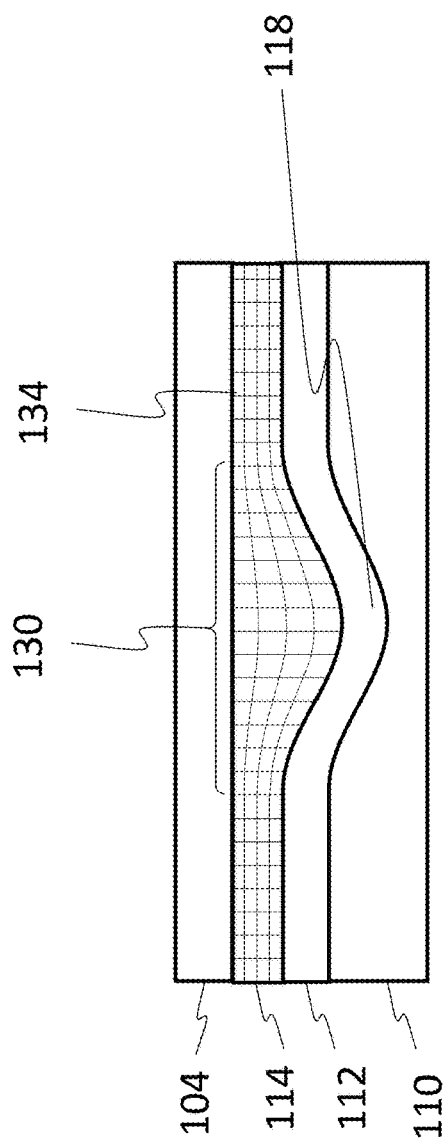
FIG. 5 is a drawing depicting a compliant layer of the light-emitting device of FIG. 3 and showing a region of the compliant layer under tensile strain.

Embodiments of the present invention will now be described with reference to the drawings, wherein like reference numerals are used to refer to like elements throughout. It will be understood that the figures are not necessarily to scale.

An aspect of the invention is a light-emitting device having improved impact resistance over conventional configurations. In exemplary embodiments, a light-emitting device constitutes a light-emitting diode (LED) display device which includes a housing, a display panel layer, a window layer that is bonded to the display panel layer, and an impact absorbing element that is disposed between the display panel layer and the housing. The impact absorbing element includes an impact absorbing layer, a deformable metal layer disposed between the impact absorbing layer and the display panel layer, and a compliant layer disposed between the metal layer and the display panel layer that prevents the deformation of the metal layer from transferring into a shape of the display panel layer.

When an object is incident on the window layer with a high energy and the object collides with the window layer, the maximum stress within the metal layer causes a permanent yield of the metal layer while the maximum stresses in the display panel layer and the window layer do not render the display panel inoperable. The deformation transfer from the metal layer to the display panel layer is prevented by providing the compliant layer therebetween. The compliant layer is formed to have a low stiffness in a direction of the thickness of the compliant layer such that the display panel layer is not deformed. Accordingly, the device has an improved resilience to impact, such as the impact of an object on the window layer. As described herein, the prevention of discernible damage to the display panel may also correspond to the resilience of the display device.

The compliant layer is formed to have a high compliance, or a relatively low mechanical stiffness in the thickness direction. The stiffness of the compliant layer may be less than the stiffness of the display panel, which enables a permanent modification of the metal layer to occur during the impact, while the flatness of the display panel layer is maintained. Accordingly, the deformation of the metal layer is not discernible to the user of the display. The present disclosure generally pertains to a force occurring in a direction that is normal or perpendicular to the plane of the surface or surfaces of the display. The deformation of the metal layer may occur in the direction of the force.

In an exemplary embodiment, the display panel layer and the window layer may be bendable and formed into curved shapes at different times during the use of the display device. In the bendable display device, the window layer may have a low stiffness and the impact absorbing element may be arranged in the region of the bendable display which undergoes shape change, such as the curved portion at a hinge. The impact absorbing element is advantageous in that if a permanent crease forms in the metal layer at the curved portion, the compliant layer reduces the transfer of the crease shape to the display panel layer such that the crease is not discernible through the window layer of the device.

In another exemplary embodiment, the compliant layer may have an anisotropic stiffness with the planar stiffness of the compliant layer being higher than the stiffness in the thickness direction of the compliant layer. The higher stiffness in the plane of the compliant layer ensures that a high stiffness of the metal layer supports the display panel in the planar direction to reduce stress in the display panel during the impact, while the low stiffness in the thickness direction reduces or prevents the transfer of the deformation in the metal layer to the display panel.

In still other exemplary embodiments, the stiffness in the thickness direction of the compliant layer may be lower than the stiffness of each of the metal layer and the impact absorbing layer in the thickness direction.

FIG. 1 is a drawing depicting a display device 100 according to the present application that includes a housing 102, a display panel layer 104, a window layer 106, and an impact absorbing element 108. The housing 102 is arranged as an end layer or bottom layer of the display device 100, and the impact absorbing element 108 is arranged adjacent the housing 102 and includes a plurality of layers. The housing 102 may protect a rear surface, or a surface opposite to the window layer 106 of the display device 100. The impact absorbing element 108 is formed of an impact absorbing layer 110, a metal layer 112, and a compliant layer 114. The impact absorbing element 108 is disposed adjacent the housing 102, and within the impact absorbing element 108, the metal layer 112 is disposed between the impact absorbing layer 110 and the compliant layer 114. The compliant layer 114 is disposed between the metal layer 112 and the display panel layer 104 and is configured to prevent a transfer of deformation of the metal layer to the display panel layer 104.

The display panel layer 104 is arranged adjacent the impact absorbing element 108 opposite the housing 102 and may include a transmissive or emissive imaging material that emits light to display content to a user. The display panel layer 104 may be formed of a plurality of layers including at least a substrate layer on which any suitable pixel structure is formed. The substrate layer may be the layer nearest to the housing 102. In an exemplary embodiment, the pixel structure formed on the substrate layer may include an array of organic light-emitting diodes (OLEDs) or quantum dot light emitting diodes (QLEDs) which are operable as an active matrix display by way of a thin film transistor (TFT) backplane. In an exemplary embodiment, the substrate layer may be formed of any suitable flexible material which enables the display device 100 to be bendable or flexible. Providing a flexible material may be particularly suitable for use in OLED and QLED displays, and an example of a suitable flexible material is a polyimide material. One or more support films and/or thermal dissipation elements may be disposed between the display substrate and the impact absorbing element 108. The films may be attached to adjacent layers by adhesive layers of the display panel layer 104.

The plurality of layers of the display panel layer 104 may include any suitable number of layers that enhance the quality of the emitted image and display interface operations. The display panel layer 104 may have a thickness that is greater than a thickness of each of the individual layers of the impact absorbing element 108, and is greater than a thickness of the window layer 106. In an exemplary embodiment of the display panel layer 104, the display panel layer 104 may include at least one of a touch sensor layer, an optical polarizer layer, and multiple adhesive layers that are arranged between two adjacent layers for bonding. The touch sensor layer may be a capacitive touch sensor formed from electrodes that are deposited on a polymer sheet, or any other suitable touch sensor. The optical polarizer layer may be a circular polarizer, and the adhesive layers may have a low light absorption for light emitted from the display panel layer 104 and refractive indices that are similar to the layers which are being bonded by the adhesive layers. For example, adhesive layers may be formed of an indexed-matched optically clear adhesive. The layers of the display panel layer 104 are stacked in any suitable order or arrangement.

FIG. 2 shows the display device 100 prior to impact by an impacting object 116 against the window layer 106. During a collision of the impacting object 116 against the window layer 106 of the display device 100, a relative motion mi occurs between the impacting object 116 and the window layer 106. The relative motion mi may occur in a direction that is normal or perpendicular to a width w of the display device 100. The width w of the display device 100 also defines the plane of the display device 100 such that a thickness of each of the layers in the display device 100 extends in a direction normal to the plane of the display device 100.

FIG. 3 shows the display device 100 after the impact by the impacting object 116. During impact of an impacting object 116, stresses in the window layer 106, the display panel layer 104, and the impact absorbing element 108 increase to maximum values before decreasing. The window layer 106 may have a low thickness, such as less than 100 microns, and a low stiffness. The maximum stresses may occur around the time that the velocity of the impacting object 116 is zero, such as prior to the impacting object 116 rebounding relative to the display device 100. For an impacting object of a given size and shape, the maximum stresses may increase as the initial kinetic energy of the impacting object 116 increases. For example, if the impacting object 116 is dropped onto the window layer 106 of the display device 100 from a greater height, the kinetic energy of the impacting object 116 immediately prior to contact with the window layer 106 is higher and consequently, the resulting maximum stresses will be greater.

During impact by the impacting object 116, the stress within the metal layer 112 may cause permanent yield or deformation of the metal layer 112, while the maximum stresses in the display panel layer 104 and the window layer 106 may not render the display panel layer 104 inoperable. For example, the layers of the display panel layer 104, such as the TFT backplane, the OLEDs/QLEDs which contain the pixel structure of the display panel layer 104, the touch sensor, and the optical polarizer may remain operable after the impact. To illustrate the effect of impact, further reference is made to FIG. 4, which is a drawing depicting a finite element analysis of a deformable metal layer of the light-emitting device of FIG. 3 during the collision. As shown in FIGS. 3 and 4, the permanent deformation of the metal layer 112 may occur in the direction of the thickness of the display device 100. For example, a deflected section 118 of the metal layer 112 may protrude downwardly toward the housing 102 away from the window layer 106. The deformation of the metal layer 112 may occur in any shape.

The metal layer 112 may be formed of any suitable material, and the metal layer 112 may have any suitable thickness. Suitable materials include stainless steel, iron, aluminum, copper, and alloys thereof. The metal layer 112 may have a thickness between 10 and 100 microns. In an exemplary embodiment, the thickness may be between 20 and 60 microns. The thickness and material of the metal layer 112 may be selected to reduce the maximum stresses of the layers in the display panel layer 104 to provide an optimal impact absorption that minimizes the amount of damage within the display device 100.

In an exemplary embodiment, the metal layer 112 of the display device 100 may be formed of stainless steel and have a thickness of approximately 30 microns. FIG. 4 shows the display device 100 during impact by a steel ball having a mass of 100 grams that is dropped from a height of 20 centimeters and is accelerated by gravity. Graph 120 of FIG. 4 shows a deformation 122 in cross-section along the width w of the metal layer 112, such that the y-axis 121 pertains to the height of the display device 100. The curvature of the deformation 122 may conform to a shape of the ball or impacting object. In the exemplary embodiment, the width w may be approximately 1.7 millimetres.

The chart 120 additionally shows the von Mises stress along the width w in units of Pascals (Pa). The chart 120 indicates that the deformation of the metal layer 112 may be high and that the von Mises stress exceeds a yield stress or elastic limit for stainless steel, such that the stress may be at a peak, and inelastic or plastic deformation occurs. Consequently, the metal layer 112 may be permanently deformed. For example, a first von Mises stress 124 along the deflected section 118 of the metal layer 112 is greater than a second von Mises stress 126 toward a straight or undeflected portion 128 of the metal layer 112. In an exemplary embodiment, the first von Mises stress may be approximately 1.34 GPa and the second von Mises stress may be approximately 0.61 GPa. The von Mises stresses within the metal layer 112 may gradually decrease along the width w of the metal layer 112 from a deepest portion of the deflected section 118 toward the undeflected portion 128.

In an exemplary embodiment, the impact absorbing layer 110 may be formed of one or more layers of any suitable material. A suitable material may be a polymer material, such as a polyester. The impact absorbing layer 110 may have any suitable thickness. The thickness may be less than 1 millimeter and in exemplary embodiments, the thickness may be between 50 and 200 microns. The thickness of the impact absorbing layer 110 may be selected to reduce the maximum stress within the display panel layer 104 and reduce any discernible damage to the display panel layer 104 without adding excessive thickness to the display device 100.

The window layer 106 is arranged adjacent the display panel layer 104 opposite the impact absorbing element 108 and is an end layer or upper layer of the display device 100. In an exemplary embodiment, the window layer 106 may be formed as a window film and may be formed of one or more layers of any suitable transparent material. Suitable materials include glass, polyimides, or thermoplastics. Polyethylene terephthalate (PET) may be a suitable material. The window layer 106 may have any suitable thickness, such as between 10 and 150 microns. In an exemplary embodiment, the window layer 106 may be formed of one or more glass layers having a thickness between 10 and 100 microns. In another exemplary embodiment, the window layer 106 may be formed of PET having a thickness between 50 and 150 microns. In still another exemplary embodiment, the window layer 106 may be formed of a polyimide having a thickness that is between 50 and 150 microns. In still another embodiment, the window layer 106 may be formed of a hard coating disposed on a polymer material.

The display device 100 may further include any suitable number of adhesive layers, and the adhesive layers may be arranged between any of the layers in the display device 100, such as between the impact absorbing layer 110 and the metal layer 112, between the metal layer 112 and the compliant layer 114, or between the compliant layer 114 and the display panel layer 104. The compliant layer 114 may be configured to both provide mechanical compliance and adhere the metal layer 112 to the display panel layer 104. For example, the compliant layer 114 may be formed as an adhesive having a suitable elastic modulus.

Figure 6:
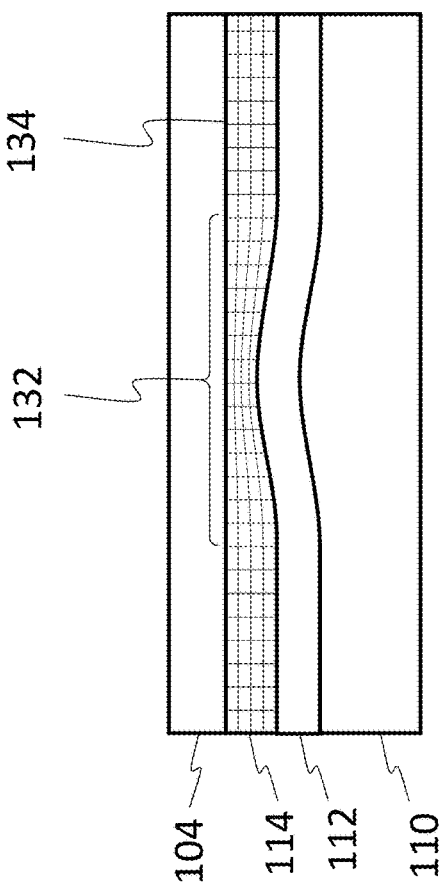
FIG. 6 is a drawing depicting the compliant layer of the light-emitting device of FIG. 3 and showing the region of the compliant layer under compressive strain.

FIGS. 5 and 6 show a detailed view of the compliant layer 114 after the impact by the impacting object 116, and the operation of the compliant layer 114 to prevent transfer of the deformation of the metal layer 112 to the display panel layer 104. As shown in FIGS. 5 and 6, the compliant layer 114 may be stretched or compressed by deformation of the metal layer 112. As shown in FIG. 5, the metal layer 112 may dominate and pull the compliant layer 114 downwardly toward the housing. The compliant layer 114 has a high compliance or low mechanical stiffness, and is formed of any suitable material. The compliant layer 114 may be in the form of a multilayer formed of different materials. Suitable materials include an elastomer material, a polymer material, an adhesive material, and any combination thereof. The compliant layer 114 may have any suitable thickness, such as a thickness that is between 10 and 100 microns. In an exemplary embodiment, the thickness may be between 10 and 50 microns. The thickness is selected to ensure that the deformation of the metal layer 112 is not transferred to the display panel layer 104 while also being less than a thickness that would cause easy deformation of the display panel layer 104 at the surface of the window layer, such as by a stylus or finger pressure.

The stiffness of the compliant layer 114, which may also be referred to as the modulus of elasticity or Young's modulus, may be less than one GPa. In exemplary embodiments, the elastic modulus may be less than 100 MPa and in still other embodiments, the stiffness may be between 10 kPa and 1 MPa. The stiffness of the display panel layer 104 may be between 1 GPa and 10 GPa. In exemplary embodiments, the stiffness of the display panel layer 104 may be between 2 GPa and 7 GPa. The modulus of the compliant layer 114 is selected to ensure that the deformation of the metal layer 112 is not discernibly transferred to the display panel layer 104.

The compliant layer 114 may have an anisotropic stiffness such that the stiffness for directions in the plane of the compliant layer 114, such as along the width of the compliant layer 114, are higher than the stiffness in the thickness direction of the layer. The higher stiffness in the plane of the compliant layer 114 ensures that the high stiffness of the metal layer 112 below the compliant layer 114 supports the display panel layer 104 in the planar or horizontal direction. Consequently, stress in the display panel layer 104 during impact is reduced while the low stiffness in the thickness direction reduces the transfer of the deformation from the metal layer 112 to the display panel layer 104. In an exemplary embodiment, the stiffness of the compliant layer 114 may be lower than the stiffness of the metal layer 112 in the thickness direction, and lower than the stiffness of the impact absorbing layer 110 in the thickness direction.

FIG. 5 shows a region 130 of the compliant layer 114 that is under tensile strain, and FIG. 6 shows a region 132 of the compliant layer 114 that is under compressive strain. The tensile strain and the compressive strain are each indicated by a grid. As shown in FIG. 5, the stiffness of the compliant layer 114 is low such that the surface 134 of the display panel layer 104 proximate to the compliant layer 114 and the metal layer 112, or lower surface of the display panel layer 104, is not discernibly deformed or deformed at all. FIG. 6 shows the deformation of the metal layer 112 upwardly away from the housing toward the display panel layer 104. Similarly to the stiffness of the compliant layer 114 of FIG. 5, the stiffness in the thickness direction of the compliant layer 114 is low to prevent deformation of the lower surface 134 of the display panel layer 104.

Due to the compliance, or low stiffness of the compliant layer 114 and the stiffness of the display panel layer 104, the deformation of the metal layer 112 is not discernibly transferred into the shape of the display panel layer 104, as shown in FIGS. 5 and 6. The compliant layer 114 may deform similarly in shape to the metal layer 112. In an exemplary embodiment, the lower surface 134 of the display panel 104 and a top surface of the compliant layer 114 adjacent the lower surface 134 of the display panel layer 104 may remain flat while the bottom surface of the compliant layer 114 may deform with the metal layer 112. The compliant layer 114 may have elastic deformation or reversible deformation. In other exemplary embodiments, the deformation may be inelastic or irreversible deformation. After either reversible or irreversible deformation of the compliant layer 114, the lower surface 134 of the display panel layer 104 remains flat such that the mechanical deformation of the metal layer 112 does not degrade the visual appearance of the display.

Figure 8:
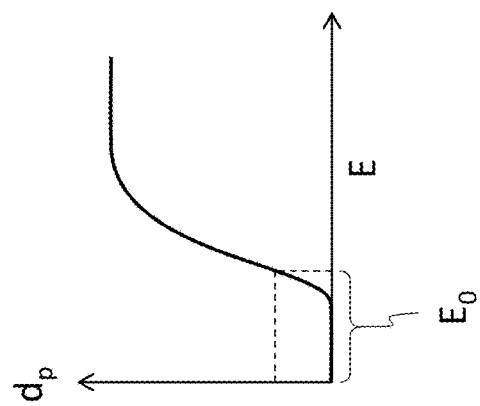
FIG. 8 is a drawing depicting a graphical representation of a relationship between an elastic modulus of the compliant layer and the deformation of the display panel layer of FIG. 7.
Figure 7:
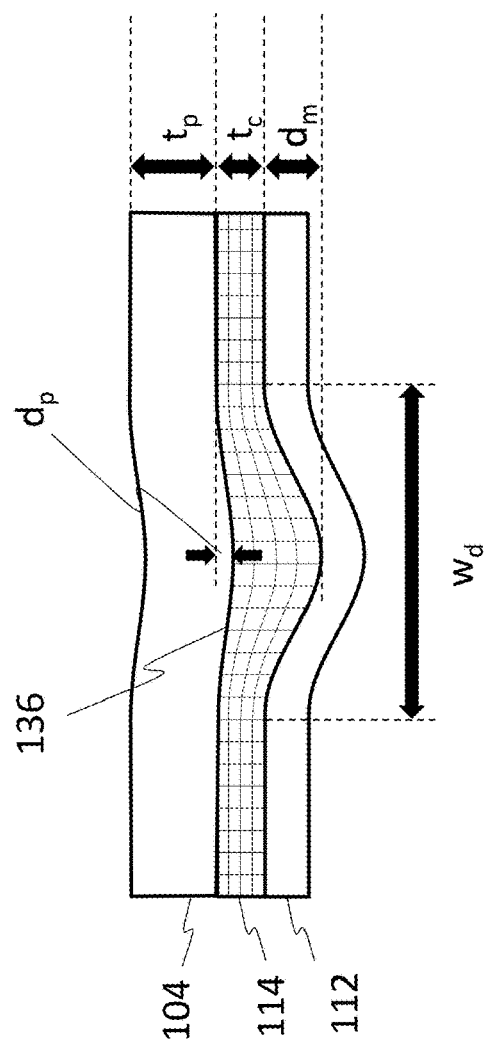
FIG. 7 is a drawing depicting the compliant layer of FIG. 5 and showing a deformation in a display panel layer of the light-emitting device.

FIGS. 7 and 8 show an exemplary embodiment in which the display panel layer 104 includes a polyimide film and the compliant layer 114 is disposed between the polyimide film and the metal layer 112. The polyimide film may have a stiffness that is between 2 GPa and 7 GPa. The polyimide film may be part of a display substrate or a support film attached below the display substrate. The polyimide film may have a thickness $t_p$ that is approximately 50 microns, the compliant layer 114 may have an initial thickness $t_c$ that is approximately 30 microns, and a deformation $d_m$ of the surface of the metal layer 112 may be approximately 30 microns. The deformation $d_m$ may occur along a planar section of the display device having a width $w_d$. The width $w_d$ may be approximately three millimeters. In other exemplary embodiments, the width $w_d$ may be more or less than three millimeters.

A lower surface 136 of the polyimide film may have a deformation $d_p$ that is dependent on the stiffness or the Young's modulus of the compliant layer 114. As shown in FIG. 8, the deformation $d_p$ may be directly proportional to the Young's module E of the compliant layer 114. The deformation $d_p$ may be zero or nearly zero at lower values of Young's moduli. Small Young's moduli may result in small deformations in the display panel layer, such as deformation of the polyimide film that essentially is not discernible to a user or viewer of the display device 100. Suitable values of deformations within the display panel layer may be lower than 50 microns. In exemplary embodiments, the deformations may be lower than 10 microns. Such small deformations may avoid deficiencies such as a Mura Effect or other optical defects that are caused by other circumstances, such as small changes in the direction of emission of light from the display pixels in the deformed region, or optical interface effects associated with reflection or birefringence of materials.

Referring now to FIGS. 9-11, a bendable display device 200 according to the present application is shown. The bendable display device 200 includes a rigid housing 202, a display panel layer 204, a window layer 206, and an impact absorbing element that includes an impact absorbing layer 210, a metal layer 212, and a compliant layer 214. The display panel layer 204 and the window layer 206 may be bendable and formed into curved shapes at different times during the use of the layers as a display. The bendable display device 200 may be transitioned from one shape to another shape periodically, and the curved shape may be formed by either inward bending, such as to a concave shape with respect to an outer surface of the window layer 206, or outward bending, such as to a convex shape with respect to the outer surface of the window layer 206. FIGS. 9-11 show the bendable display device 200 that is configured for inward bending or folding.

A portion of the bendable display device 200 or the entire bendable display device 200 may be formed into curved shapes. In an exemplary embodiment, the bendable display device 200 may include a rigid region 216 and a hinge region 218 adjacent the rigid region 216. A plurality of rigid regions 216 may be provided interspersed with a plurality of hinge regions 218. The rigid region(s) 216 may remain in a fixed or planar shape when the bendable display device 200 is bent or curved, and the hinge region(s) 218 may be a bending portion which undergoes shape change when the bendable display device 200 is bent or curved. The bendable display device 200 may be bendable by any suitable radius of curvature. Suitable radii of curvature may be between one and five millimeters.

The display panel layer 204 and the window layer 206 may each be formed of a plurality of layers that are bendable with a low force. In an exemplary embodiment, the display panel layer 204 may be formed of a substrate, a touch sensor, and a polarizer. The layers of the display panel layer 204 may be formed of any suitable material, such as a polymer material. Polyimide or PET films may be suitable. The window layer 206 may be formed of glass or a polymer material. Polyimide or PET films may also be suitable materials for the window layer 206. In an exemplary embodiment in which the window layer 206 has a glass layer, a thickness of the glass layer may be less than 100 microns.

The impact absorbing element 210, 212, 214 is disposed on the housing 202. The housing 202 may be configured to protect the rear surface of the bendable display device 200. The impact absorbing element 210, 212, 214 may be disposed between the display panel layer 204 and the housing 202 in all regions of the bendable display device 200 or in some regions of the bendable display device 200. For example, the impact absorbing element 210, 212, 214 may be disposed only in the rigid region 216, in the hinge region 218, or in both the rigid reasons and hinge regions. The impact absorbing layer 210 may be formed of any suitable material and the material may have a stiffness that is less than a stiffness of each of the metal layer 212 and the housing 202. Accordingly, a deformed shape of the metal layer 212 is dominant and will not be elastically pulled back to a flat shape by the elasticity of the impact absorbing layer 210.

FIG. 9 shows a cross-sectional view of the bendable display device 200 when the bendable display device 200 is in a flat state prior to bending. The housing 202 includes two rigid regions, and the hinge region 218 is disposed between the two rigid regions. In the flat state, the hinge region 218 enables the display panel to be flat, or planar. FIG. 10 shows a cross-sectional view of the bendable display device 200 when the bendable display device 200 is bent inwardly to a folded state. When in the folded state, the hinge region 218 enables the bendable display device 200 to have a cylindrical concave shape relative to the outer surface of the window layer 206.

FIG. 11 shows a cross-section view of the bendable display device 200 after a single bending movement or several bending movements between the flat state of FIG. 9 and the folded state of FIG. 10, or alternatively, after a prolonged period in the folded state. After the single bending movement or several bending movements, or prolonged storage in the folded state, a crease 220 may form in the metal layer 212 such that the metal layer 212 is no longer flat when the bendable display device 200 is in the flat state. Providing the compliant layer 214 reduces the transfer of the creased shape to the display panel layer 204, similarly as to the compliant layer 114 of the display device 100 in response to an impact as shown in FIGS. 5 and 6. Accordingly, even if the crease 220 forms in the metal layer 212, and becomes a permanent crease, the crease 220 essentially is not discernible when viewing or using the display device 200. Using the compliant layer 214 enables the bendable display device 200 to undergo more shape change cycles before any crease would be discernible by a user of the bendable display device 200.

The compliant layer 214 may be provided in the bendable display device 200 configured for inward folding or bending. In another exemplary embodiment, a compliant layer may be provided in a bendable display device configured for outward folding or bending. In still another exemplary embodiment, a compliant layer may be provided in in a bendable display device that is configured for both inward and outward folding. For example, the compliant layer may be provided in a bendable display device that has a portion that is inwardly foldable and a different portion that is outwardly foldable, or a bendable display device in which a same portion is both inwardly and outwardly foldable.

FIGS. 12 and 13 show a display device 300 in which the display device 300 includes the housing 102, the display panel layer 104, the window layer 106, the metal layer 112, and the impact absorbing layer 110 as previously described. The impact absorbing element of the display device 300 does not include a compliant layer as in embodiments of the present application. FIG. 12 shows the display device 300 prior to impact by the impacting object 116, and FIG. 13 shows the display device 300 after the impact. As shown in FIG. 13, the metal layer 112 has permanent deformation which is transferred to the display panel layer 104. Accordingly, the display device 300 that does not include a compliant layer may have a discernible change in appearance of the display after being subject to an impact. Embodiments of the present application, therefore, improve over such a configuration, whereby the compliant layer is incorporated into an absorbing element to substantially prevent transfer of deformation to the display panel, and thus any deformation of the display panel is minimal and thus not discernible to a user.

An aspect of the invention is a light-emitting device including a display panel layer, a housing layer, an impact absorbing layer adjacent the housing layer, a metal layer that is disposed between the impact absorbing layer and the display panel layer and that is deformable during an impact on the light-emitting device, and a compliant layer that is disposed between the metal layer and the display panel layer that enables a shape of the display panel layer to be maintained when the metal layer is deformed.

In an exemplary embodiment of the light-emitting device, the compliant layer has a stiffness that is less than a stiffness of the display panel layer.

In an exemplary embodiment of the light-emitting device, the compliant layer is formed of at least one of an elastomer material, a polymer material, or an adhesive material.

In an exemplary embodiment of the light-emitting device, the compliant layer has a stiffness that is less than a stiffness of each of the metal layer and the impact absorbing layer.

In an exemplary embodiment of the light-emitting device, the compliant layer has a stiffness that is between 10 kPa and 1 GPa.

In an exemplary embodiment of the light-emitting device, the display panel layer has a stiffness that is between 1 GPa and 10 GPa.

In an exemplary embodiment of the light-emitting device, the compliant layer has an anisotropic stiffness, wherein a planar stiffness in a plane of the compliant layer is greater than a thickness stiffness in a thickness direction of the compliant layer.

In an exemplary embodiment of the light-emitting device, the compliant layer is formed as a multilayer of different materials.

In an exemplary embodiment of the light-emitting device, the compliant layer has a thickness that is between 10 and 100 microns.

In an exemplary embodiment of the light-emitting device, the metal layer is formed of an alloy material that is includes at least one of stainless steel, iron, aluminum, or copper.

In an exemplary embodiment of the light-emitting device, the metal layer has a thickness that is between 10 and 100 microns.

In an exemplary embodiment of the light-emitting device, the device includes a window film layer disposed adjacent the display panel layer opposite the compliant layer.

In an exemplary embodiment of the light-emitting device, the window film layer and the display panel layer are bendable.

In an exemplary embodiment of the light-emitting device, the window film layer is formed of at least one layer of a glass material, a polyimide material, or a thermoplastic material.

In an exemplary embodiment of the light-emitting device, the window film layer has a thickness that is between 10 and 150 microns.

In an exemplary embodiment of the light-emitting device, the window film layer includes a hard coating disposed on a polymer material.

In an exemplary embodiment of the light-emitting device, the impact absorbing layer is formed of at least one layer of a polymer material.

In an exemplary embodiment of the light-emitting device, the impact absorbing layer has a thickness that is less than 1 millimeter.

In an exemplary embodiment of the light-emitting device, an electronic device may include at least one light-emitting device, with the display including at least one of a touch sensor layer, a polarizer layer, and an adhesive layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to LED or OLED devices that, for example, may be used for light-emitting elements in a display device. Embodiments of the present invention are applicable to many display devices to permit display devices of high resolution and high image quality. Examples of such devices include televisions, mobile phones, personal digital assistants (PDAs), tablet and laptop computers, desktop monitors, digital cameras, and like devices for which a high-resolution display is desirable.

REFERENCE SIGNS LIST

100—display device
102—housing
104—display panel layer
106—window layer
108—impact absorbing element
110—impact absorbing layer
112—metal layer
114—compliant layer
116—impacting object
118—deflected section
120—chart of impact
121—y-axis
122—deformation
124—first von Mises stress
126—second von Mises stress
128—straight or undeflected portion
130—region under tensile strain
132—region under compressive strain
134—surface of display panel layer
135—lower surface
136—lower surface
200—bendable display device
202—rigid housing
204—display panel layer
206—window layer
210—impact absorbing layer
212—metal layer
214—compliant layer
216—rigid region
218—hinge region
220—crease
300—example display device

The invention claimed is:

1. A light-emitting device comprising:
a display panel layer;
a housing layer;
an impact absorbing layer adjacent the housing layer;
a metal layer that is disposed between the impact absorbing layer and the display panel layer and that is permanently deformable during an impact on the light-emitting device; and
a compliant layer that is disposed between the metal layer and the display panel layer and deforms by the permanent deformation of the metal layer, wherein when the metal layer is permanently deformed during the impact the compliant layer deforms such that the permanent deformation of the metal layer is not transferred to the display panel.

2. The light-emitting device of claim 1, wherein the compliant layer has a stiffness that is less than a stiffness of the display panel layer.

3. The light-emitting device of claim 1, wherein the compliant layer is formed of at least one of an elastomer material, a polymer material, or an adhesive material.

4. The light-emitting device of claim 1, wherein the compliant layer has a stiffness that is less than a stiffness of each of the metal layer and the impact absorbing layer.

5. The light-emitting device of claim 1, wherein the compliant layer has a stiffness that is between 10 kPa and 1 GPa.

6. The light-emitting device of claim 1, wherein the display panel layer has a stiffness that is between 1 GPa and 10 GPa.

7. The light-emitting device of claim 1, wherein the compliant layer has an anisotropic stiffness, wherein a planar stiffness in a plane of the compliant layer is greater than a thickness stiffness in a thickness direction of the compliant layer.

8. The light-emitting device of claim 1, wherein the compliant layer is formed as a multilayer of different materials.

9. The light-emitting device of claim 1, wherein the compliant layer has a thickness that is between 10 and 100 microns.

10. The light-emitting device of claim 1, wherein the metal layer is formed of an alloy material that is includes at least one of stainless steel, iron, aluminum, or copper.

11. The light-emitting device of claim 1, wherein the metal layer has a thickness that is between 10 and 100 microns.

12. The light-emitting device of claim 1, further comprising a window film layer disposed adjacent the display panel layer opposite the compliant layer.

13. The light-emitting device of claim 12, wherein the window film layer is formed of at least one layer of a glass material, a polyimide material, or a thermoplastic material.

14. The light-emitting device of claim 12, wherein the window film layer has a thickness that is between 10 and 150 microns.

15. The light-emitting device of claim 12, wherein the window film layer includes a hard coating disposed on a polymer material.

16. The light-emitting device of claim 1, wherein the impact absorbing layer is formed of at least one layer of a polymer material.

17. The light-emitting device of claim 1, wherein the impact absorbing layer has a thickness that is less than 1 millimeter.

18. An electronic device comprising at least one light-emitting device according to claim 1, wherein the display includes at least one of a touch sensor layer, a polarizer layer, and an adhesive layer.

19. A light-emitting device comprising:
a display panel layer;
a housing layer;
an impact absorbing layer adjacent the housing layer;
a metal layer that is disposed between the impact absorbing layer and the display panel layer and that is deformable during an impact on the light-emitting device; and
a compliant layer that is disposed between the metal layer and the display panel layer that enables a shape of the display panel layer to be maintained when the metal layer is deformed;
wherein the compliant layer has an anisotropic stiffness, wherein a planar stiffness in a plane of the compliant layer is greater than a thickness stiffness in a thickness direction of the compliant layer.

20. A light-emitting device comprising:
a display panel layer;
a housing layer;
an impact absorbing layer adjacent the housing layer;
a metal layer that is disposed between the impact absorbing layer and the display panel layer and that is deformable during an impact on the light-emitting device; and
a compliant layer that is disposed between the metal layer and the display panel layer that enables a shape of the display panel layer to be maintained when the metal layer is deformed;
wherein the metal layer has a thickness that is between 10 and 100 microns.

* * * * *